Patented June 13, 1944

2,351,119

UNITED STATES PATENT OFFICE 2,351,119

COLORING MATTER OF THE PHTHALOCYANINE SERIES

Norman Hulton Haddock, Blackley, Manchester, England, assignor to Imperial Chemical Industries Limited, a corporation of Great Britain No Drawing. Application July 15, 1942,
Serial No. 451,076

9 Claims. (Cl. 260—146)

This invention relates to new coloring matters of the phthalocyanine series. More particularly, this invention deals with polyazo compounds of the phthalocyanine series, useful as pigments.

In my parent application Serial No. 335,871, filed May 17, 1940, (Patent No. 2,280,072, issued April 21, 1942) I have described a novel method for producing metal-free and metallic tetra-amino-phthalocyanines, obtained by reduction of the corresponding tetranitro-phthalocyanines.

As typical tetranitro-phthalocyanines which may be economically employed for this purpose, there were mentioned copper-tetra-(4)-nitro-phthalocyanine, copper-tetra-(3)-nitro-phthalocyanine, mixtures of these; other metallic tetranitro-phthalocyanines for instance those of cobalt, nickel, aluminum, lead or magnesium; and also metal-free tetranitro-phthalocyanine.

The tetra-amines thus obtained were described as generally green in color and insoluble in water. They are turned blue by the action of acids, for example hydrochloric acid, seemingly owing to salt formation. When subjected to the action of nitrous acid, they are readily diazotized, and in this form are useful as intermediates, namely diazo components, in the preparation of coloring matters.

In a similar manner, phthalocyanines having three or two diazonium groups may be prepared by starting with the corresponding trinitro and dinitro-phthalocyanines. These in turn may be prepared by synthesizing phthalocyanines from the preferred metal, say copper or cobalt, on the one hand and from a mixture of phthalonitrile and nitrophthalonitrile (in molal ratio 1:3 or 2:2, respectively) on the other hand. Also, by starting with a tetranitro-phthalocyanine and reducing to a tetra-amino compound but using then a limited quantity of nitrous acid, phthalocyanine compounds containing less than four diazo groups per molecule may be produced.

Now, according to my present invention, the above tetra-, tri- or di- diazo-phthalocyanine compounds, hereinafter referred to generically as polydiazo-phthalocyanines, may be converted into valuable pigments by coupling the same to coupling components which are devoid of water-solubilizing groups.

Among the various coupling components suitable for the above purpose may be mentioned alpha- and beta- naphthol, aceto-acetanilide, aceto - acet-o-toluidide, aceto-acet-o-chloro-anilide, 2-hydroxy-carbazole-3-carboxylic-p-chloroanilide, and the various arylamides of 2,3-hydroxy-naphthoic acid and 1-aryl-3-methyl-5-pyrazolones which are devoid of sulfo and carboxy groups, either in the form of the free acid or in the form af their salts. As will be readily recognized, these components represent the class generally referred to in the art as "ice-color coupling components".

As suitable polydiazo-phthalocyanine compounds, any of those specifically mentioned above may be employed, as well as numerous other polydiazo-phthalocyanine compounds of the benzene series, provided they are devoid of water-solubilizing groups (e. g. sulfo and carboxy).

Except for possible partial decomposition of the diazonium groups before coupling is completed, it may be assumed that each diazonium group in the phthalocyanine molecule couples to one molecule of the coupling component. The resulting polyazo compounds are generally intensely coloured bodies and have other properties making them very suitable for use as pigments. They are insoluble in water and also in high boiling organic solvents. The new compounds may be employed for example in paints or printing ink compositions.

*Example 1*

A solution of tetra-diazotized copper-tetra-(4)-amino-phthalocyanine obtained as described below is gradually added to a solution of 22 parts of β-naphthol in 850 parts of 1% sodium hydroxide solution. Meanwhile 30% aqueous sodium hydroxide solution is added as required to keep the mixture alkaline to Brilliant Yellow paper during the course of the coupling. A violet precipitate is formed. When the addition of the tetra-diazo solution is complete the mixture is stirred for 1 hour further and the precipitate then filtered off, washed with water and dried. The product is a violet powder, insoluble in water and high boiling organic solvents such as nitrobenzene. It gives violet shades on paper when applied in printing ink.

The tetra-diazo solution employed above is made by mixing 12.3 parts of finely divided copper-tetra - (4) - amino-phthalocyanine with 150 parts of water and adding 6 parts of sodium nitrite in 20 parts of water. The mixture is cooled to 0–5° C. and quickly added to 90 parts of well-stirred concentrated hydrochloric acid at 0–5° C. An almost clear dark green solution of the tetra-diazo compound is obtained.

If 2:3-hydroxynaphthoic anilide is used instead of β-naphthol a product of similar shade is obtained. When the parachloranilide of 2- hydroxy-carbazole-3-carboxylic acid is employed as coupling component the product is green.

Example 2

To a slurry of 159 parts of copper-tetra-(4)-amino-phthalocyanine in 2,000 parts of ice water was added 2,000 parts of 10 normal hydrochloric acid. Then 210 parts of 5 normal sodium nitrite was added rapidly, keeping the mixture below 10° C. by external cooling. After ten minutes 10 parts of a filter aid was added and the green solution was filtered into a suspension of 186 parts of acetoacetanilide in 2,000 parts of water, to which had been added 136 parts of sodium acetate crystals. The temperature was kept at 15–20° C. and a solution of sodium hydroxide was added as needed to keep the coupling mixture neutral to Congo red paper but acid to litmus. When the diazo solution was all added, the suspension was heated to 90° C. and the green pigment filtered off and washed and dried. When the dry pigment was mixed with lithographic varnish it gave a green ink of good tinting strength and showing very good fastness to light in the masstone, undertone, and tint. This pigment was incorporated in typical vehicles for the printing of textiles, such as water-in-lacquer and lacquer-in-water emulsions in which the lacquer phase contained pigment binding agents, and in aqueous systems containing film forming materials. Cotton cloth was printed with these pigmented vehicles and the prints were dried at 150° C. for five minutes. The green prints obtained showed very good fastness to light and to washing. If other aceto-actyl-arylamines, such as aceto-acetyl-o-toluidine or aceto-acetyl-o-chlor-aniline, are used, similar green pigments are obtained.

Example 3

A filtered solution of the tetra diazonium compound was prepared as in Example 2. To it was added a solution of 184 parts of 1-phenyl-3-methyl-5-pyrazolone in 600 parts of 2 normal hydrochloric acid. There was then added 136 parts of sodium acetate crystals and enough 30% sodium hydroxide to make the charge neutral to Congo red paper while remaining acid to litmus paper. The suspension was heated to 90° C. and the pigment filtered and washed. This pigment was a green, somewhat duller than the pigment of Example 2, but equally good in fastness properties.

Instead of the freshly-prepared polydiazo-phthalocyanines employed in the above examples, solutions of their stabilized forms may be employed. The various forms of stabilization and the processes for producing them are described more fully in my copending application, Serial No. 443,668 filed May 19, 1942 (Patent No. 2,349,090, issued May 16, 1944).

In view of the selection of the original poly-nitro-phthalocyanines, wherein the nitro groups are situated in the arylene rings, it will be apparent that the novel compounds of this invention may be represented by the general formula

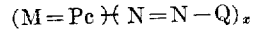

wherein M=Pc represents the radical of a benzenoid phthalocyanine compound of the group consisting of the metal-phthalocyanines and metal-free-phthalocyanine, Q represents the radical of an azo coupling component free from sulfonic or carboxylic groups, while x stands for an integer not less than 2 and not greater than 4, and wherein the N=N bridges are attached to the phthalocyanine radical in the phenylene nuclei of the latter.

I claim:

1. A compound of the general formula

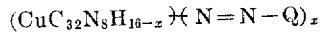

wherein M=Pc represents the radical of a benzenoid phthalocyanine compound of the group consisting of the metal-phthalocyanines and metal-free-phthalocyanine, Q represents the radical of a coupling component free of water-solubilizing radicals and being selected from the group consisting of the naphthols, the acyl-acetarylides, the 1-aryl-3-methyl-5-pyrazolones, the arylamides of 2,3-hydroxy-naphthoic acid and the arylamides of 2-hydroxy-carbazole-3-carboxylic acid, while x stands for an integer not less than 2 and not greater than 4, and wherein the N=N bridges are attached to the phthalocyanine radical in the phenylene nuclei of the latter.

2. A compound of the formula $$(CuC_{32}N_8H_{16-x})(\!\!-\!\!N=N-Q)_x$$

wherein $(CuC_{32}N_8H_{16-x})$ represents the radical of copper-phthalocyanine lacking x hydrogen atoms; Q represents the radical of a coupling component devoid of water-solubilizing radicals and being selected from the group consisting of the naphthols, the acyl-acetarylides, the 1-aryl-3-methyl-5-pyrazolones, the arylamides of 2,3-hydroxy-naphthoic acid and the arylamides of 2-hydroxy-carbazole-3-carboxylic acid, while x stands for an integer not less than 2 and not greater than 4, and wherein the N=N bridges are attached to the phthalocyanine radical in the phenylene nuclei of the latter.

3. A compound as in claim 2, wherein Q represents the radical of a naphthol, free from water-solubilizing groups.

4. A compound as in claim 2, wherein Q represents the radical of a 1-aryl-3-methyl-5-pyrazolone, free from water-solubilizing groups.

5. A compound as in claim 2, wherein Q represents the radical of an arylamide of aceto-acetic acid, free from water-solubilizing groups.

6. The polyazo pigment obtained by coupling tetradiazo-copper-phthalocyanine to β-naphthol.

7. The polyazo pigment obtained by coupling tetradiazo-copper-phthalocyanine to 1-phenyl-3-methyl-5-pyrazolone.

8. The polyazo pigment obtained by coupling tetradiazo-copper-phthalocyanine to the anilide of aceto-acetic acid.

9. The process of producing novel coloring matters of the phthalocyanine series, which comprises coupling a polydiazonium copper-phthalocyanine to an azo coupling component devoid of water-solubilizing radicals and being selected from the group consisting of the naphthols, the acyl-acetarylides, the 1-aryl-3-methyl-5-pyrazolones, the arylamides of 2,3-hydroxy-naphthoic acid and the arylamides of 2-hydroxy-carbazole-3-carboxylic acid.

NORMAN HULTON HADDOCK.